US006879568B1

(12) United States Patent
Xu et al.

(10) Patent No.: US 6,879,568 B1
(45) Date of Patent: Apr. 12, 2005

(54) QUICK LAYER-3 MESSAGE MULTIPLEXING

(75) Inventors: Xiaode Xu, Fremont, CA (US); Sheausong Yang, Saratoga, CA (US); Bhavannarayana Sri Nrusimha Nelakanti, San Jose, CA (US); Ian Sayers, Redwood City, CA (US); Wenfeng Huang, Cupertino, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/467,364

(22) Filed: Dec. 20, 1999

(51) Int. Cl.[7] .............................................. H04B 7/212
(52) U.S. Cl. ........................ 370/321; 370/337; 370/347
(58) Field of Search .............................. 370/321, 310.2, 370/328, 337, 336, 347; 455/445, 561, 560

(56) References Cited

U.S. PATENT DOCUMENTS

| | | | |
|---|---|---|---|
| 5,602,843 A | | 2/1997 | Gray |
| 5,796,729 A | | 8/1998 | Greaney et al. |
| 5,822,309 A | | 10/1998 | Ayanoglu et al. |
| 5,937,345 A | * | 8/1999 | McGowan et al. |
| 5,946,634 A | * | 8/1999 | Korpela |
| 5,970,059 A | | 10/1999 | Ahopelto et al. |
| 5,978,386 A | | 11/1999 | Hamalainen et al. |
| 5,978,672 A | | 11/1999 | Hartmaier et al. |
| 5,999,813 A | | 12/1999 | Lu et al. |
| 6,104,932 A | * | 8/2000 | Havinis |
| 6,181,682 B1 | * | 1/2001 | Abbadessa et al. |
| 6,311,069 B1 | * | 10/2001 | Havinis et al. |
| 6,374,110 B1 | * | 4/2002 | Parket et al. |
| 6,396,820 B1 | | 5/2002 | Dolan et al. |
| 6,415,151 B1 | | 7/2002 | Kreppel |
| 6,438,117 B1 | * | 8/2002 | Grilli et al. |
| 6,463,055 B1 | * | 10/2002 | Lupien et al. |
| 6,539,237 B1 | | 3/2003 | Sayers et al. |

FOREIGN PATENT DOCUMENTS

EP          0 766 427 A2     2/1997

OTHER PUBLICATIONS

Harry Newton, 1998, Newton's Telecom Dictionary, pp. 261, 262, 335, 403, 731, 732, 825.

Scourias, J., "Overview of the Global System for Mobile Communications," University of Waterloo, 1996.

Heine, G., *GSM Networks: Protocols, Terminology, and Implementation*, (MA: Artech House) , pp. 42–47; pp. 70–87; pp. 107–123 (1999).

* cited by examiner

*Primary Examiner*—Chi Pham
*Assistant Examiner*—Thai Hoang
(74) *Attorney, Agent, or Firm*—Hamilton, Brook, Smith & Reynolds, P.C.

(57) ABSTRACT

A technique for implementing a flattened Layer 3 stack model within a Global System for Mobile (GSM) communication system so that a centralized multiplex function associated with certain functions handles messages. The multiplex function dispatches radio resource (RR), mobility management (MM), or Connection Management (CM) function messages directly to the respective functional layers without first requiring such messages to pass through a stack. In the preferred arrangement, the multiplex function sub-L3 handles only uplink messages, allowing downlink messages to travel through the sub-layer stack without employing any bridging entity. The multiplex function can run independently of any of the other functions in Layer 3 or can be implemented as part of the message passing part of the Layer 2 running body so that the Layer 2 messages are routed directly to a respective RR, MM, or CM function. The flattened protocol stack permits time-sensitive messages related to location update, handover, or cell reselection and other time-critical messages to be handled more efficiently.

42 Claims, 5 Drawing Sheets

QUICK LAYER-3 MESSAGE MULTIPLEXING

BACKGROUND OF THE INVENTION

The present invention relates generally to wireless communications and in particular to a technique for implementing network layer message multiplexing.

Trends in wireless communication systems such as cellular mobile telephone systems, Personal Communication Services (PCS) systems, and the like, for the most part continue to suggest digital techniques are preferred for radio modulation. Although competing standards have been implemented in certain areas, the Global System for Mobile (GSM) communication is the most widely implemented system in the world.

The architecture of a GSM system can be broadly divided into three subsystems, including a Mobile Station, a Base Station Subsystem, and a Network Sub-System. The mobile station (MS) is the portable subscriber or user equipment with which most people are familiar. The Base Station Subsystem (BSS) is typically considered to be composed of two parts, a Base Transceiver Station (BTS) and a Base Station Controller (BSC). The BTS typically houses radio transceivers that are used to communicate signals over the air within a particular cell and handles the radio interface protocols (referred to as the Um protocols in GSM terminology) that permit the mobile station to communicate with the BSS. The BSC manages the radio resources for one or more BTS's across an interface known as the Abis interface. This functionality is concerned with managing the available radio channels such as set up, tear down, frequency assignment, and the like, as well as the required handover processing needed to continue a call in progress as a mobile station moves from cell to cell.

The central component of a GSM system is the Mobile Switching Center (MSC). The MSC acts like a switching node of a Public Services Telephone Network (PSTN). The MSC also provides other functionality needed in a mobile telephone system such as subscriber registration, authentication, location update, inter-MSC handovers, and call routing to permit subscriber roaming. These services are provided in conjunction with four intelligent databases known as the Home Location Register (HLR), Visitor Location Register (VLR), Equipment Identity Register (EIR), and Authentication Center (AuC). These databases form the remainder of the Network Sub-System (NSS) and perform administrative functions such as obtaining the location of subscribers within the network, roaming administration for mobile stations located in cells which are not part of their home area, equipment authentication and security, as well as user authentication.

Like other modern communication systems, a GSM network makes use of Open Systems Interconnect (OSI) type layered protocol to define messaging and various other functionalities. The Layer 1 (L1) or physical layer of a GSM system is generally considered to be the aforementioned Um interface defining specific radio signalling between the MS and BTS. Over the land network, such as between the BTS and BSC, L1 may be implemented with standard telephone cabling, optic fiber microwave transmission, or other physical media used for moving digital telephony signals.

Layer 2 (L2) of GSM is a data link layer responsible for the packaging of data to be transmitted. The most widespread method for such framing is a high level data link control (HDLC) protocol known as LAPD.

Of specific concern to the present invention is the Layer 3 (L3) or network layer of GSM. This layer prescribes the path a message needs to take and who the recipient of that message is, maintaining all information necessary to route a data packet to its intended destination.

Within Layer 3, the GSM standard further defines functional layers which perform certain tasks known as Radio Resource management (RR), Mobility Management (MM), and Connection Management (CM). The RR functional layer is responsible for providing a reliable radio link between the MS and the network infrastructure. This includes the establishment and allocation of radio channels, as well as performing handover processing, an essential element of cellular systems. Handover processing involves coordination of the mobile station, the BSS, and even the MSC to some degree.

The MM functional layer of Layer 3 within GSM assumes a reliable RR connection. The MM functional layer is responsible for location management and security. Location management involves procedures for updating the position of a mobile station so that the mobile station's current location is always properly stored at the HLR. This permits incoming calls to be properly routed. The MM layer also involves functions required for authentication of the mobile to prevent unauthorized access to the network, using the AuC database.

The CM functional layer is divided into a Call Control (CC), Supplementary Services (SS), and Short Message Service (SMS) sublayers. Basically, the first two layers are responsible for routing, establishment, maintenance and release of calls. The third layer provides certain supplementary services, such as a short message services that delivers data messages.

SUMMARY OF THE INVENTION

While the Global System for Mobile (GSM) standard specifies an elegant division of functionality according to the OSI layered protocol reference model, this partitioning of functionality into layers is prone to some problems in some instances. For example, location update, and more specifically, functions such as handover processing and cell reselection must typically be carried out in an environment where the mobile station is expected to be moving rapidly. When the mobile station is moving rapidly such as in an automobile, any delays associated with completing Layer 3 functions may result in delays in setting up and placing calls. In the worst case, they can result in dropped calls when messages are not processed within certain timing restrictions.

The various functional layers implemented within Layer 3 are themselves typically treated as if they were in a stack-like arrangement. For example, all required information for processing MM and CM messages is generally not considered to belong to Layer 3. Rather, the RR sublayer is typically thought of as providing the necessary transport capability to transparently carry MM and CM messages between the MS and the NSS. Thus, for example, a CM layer message must step down through the various sublayers of Layer 3 before it can be passed to GSM Layer 2 and Layer 1. So, it has been thought that a CM message must typically first pass to the MM layer and then to the RR layer, down to Layer 2, and then finally to Layer 1.

The present invention seeks to eliminate some of the disadvantages of a standard GSM-type implementation by flattening the Layer 3 stack model. In this architecture, a centralized multiplex function processes all Layer 3 messages, dispatching them to the Radio Resource management (RR), Mobility Management (MM), or Connection Management (CM) functional layer as appropriate.

In a preferred embodiment, the multiplex function only serves to process Layer 3 messages traveling in an uplink direction, that is, in a direction from the mobile station (MS) towards the network subsystem (NSS) elements. For Layer 3 messages traveling in a downlink direction, the RR, MM, and CM functional layers are permitted to pass messages directly to Layer 2 without employing any separate bridging.

The multiplex function can be implemented within a Layer 3 running body which operates independently of other functions within Layer 3. Alternatively, the multiplex function can be implemented as part of a Layer 2 running body so that, for example, outgoing uplink messages are routed directly to the RR, MM, or CM functional layers of an associated, but separate, Layer 3 block as appropriate.

The multiplex function preferably makes use of certain bits within GSM message standard format used to classify messages into groups. For example, a protocol discriminator (PD) field is specified for GSM Layer 3 messages passed over the Um interface. This PD field contains a message type identifier which determines whether specific messages are intended for the Connection Management, Mobility Management, or Radio Resource functional layers.

The present invention has several advantages. The centralized multiplex function reduces the processing time for processing message flows from Layer 2 towards Layer 3 functions. By reducing this path delay, less buffering or queuing time is needed, therefore decreasing the time needed to complete end-to-end processing of mobility-related and call processing messages. In addition, eliminating multiplex functionality entirely in the downlink direction also speeds processing. For such time-critical procedures such as location update, handover, and cell reselection, implementation of the present invention improves overall system performance and reliability. The speed improvement is also carried forward to call processing procedures as well.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
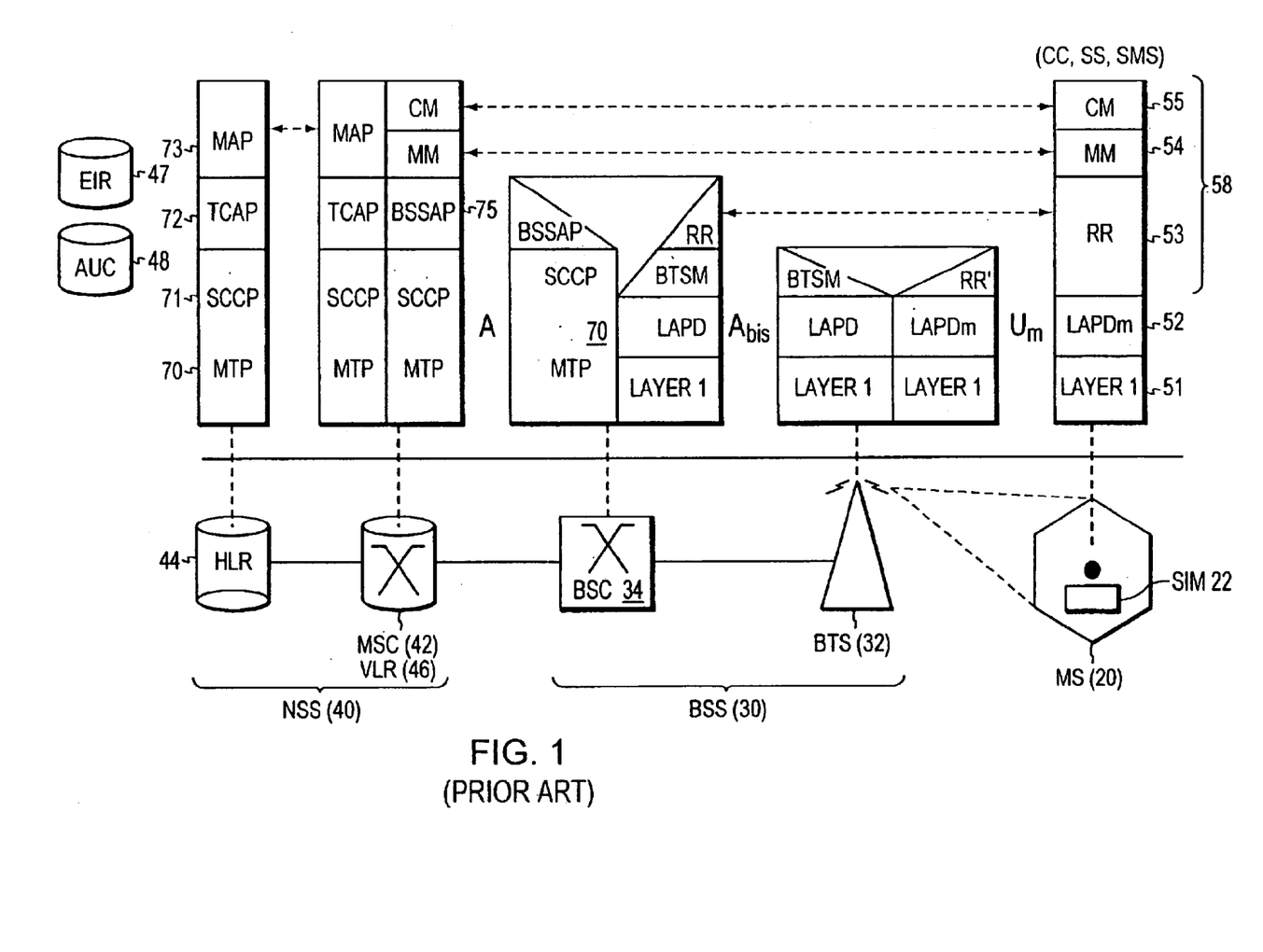
FIG. 1 is a system block diagram of a Global System for Mobile (GSM) communication system according to the prior art.

Turning attention to FIG. 1, the functional architecture of a GSM system 10 can be broadly divided into subsystems including a mobile station (MS) 20, a Base Station Subsystem (BSS) 30, and a Network Sub-System (NSS) 40. Each subsystem is comprised of functional entities which communicate through various interfaces using protocols specified by the GSM standard.

The mobile station 20 in GSM is really two distinct entities. The actual hardware is the mobile equipment, which is the equipment which the subscriber or user carries. Subscriber information, which includes a unique identifier called the International Mobile Subscriber Identity (IMSI), is stored in a Subscriber Identity Module (SIM) 22, typically implemented as a smart card. By inserting the SIM card in any GSM mobile equipment, a user is able to make and receive calls at that terminal and receive other services to which the user has subscribed. By decoupling subscriber information from a specific terminal, greater personal mobility is provided to GSM users than for other wireless systems.

The Base Station Subsystem (BSS) 30 is composed of two parts, the Base Transceiver Station (BTS) 32 and the Base Station Controller (BSC) 34. The BTS 32 houses radio transceivers that define a cell and handles the radio (Um) interface protocols with the mobile station 30. Due to the potentially large number of BTSs 32 in a system 10, the requirements for a BTS 32 are ruggedness, reliability, portability, and minimum cost.

The Base Station Controller (BSC) 34 manages radio resources for one or more BTSs 32, across the Abis interface. It manages the radio interface channels (setup, tear down, frequency hopping, etc.) as well as handovers.

A central component of the Network Sub-System 40 is the Mobile Switching Center (MSC) 42. It acts like a normal switching node of a Public Switched Telephone Network (PSTN) or Integrated Services Digital Network (ISDN). In addition, the MSC provides all the functionality needed to handle a mobile subscriber, including registration, authentication, location updating, inter-MSC 42 handovers, and call routing to roaming subscribers. These services are provided in conjunction with four intelligent databases, which together with the MSC 42 form the Network Sub-System (NSS) 40. The MSC 42 also provides connections to the public wireline terrestrial networks.

While the network side of the system, including the BTS, BSC, and MSC are suggested as encompassing different physical machines in FIG. 1, it should be understood that they may all be implemented in the same physical hardware so that physical layer interfaces Abis and A are not required.

The Home Location Register (HLR) 44 is a database which contains administrative information for each subscriber registered in the corresponding GSM network 10, along with the current location of the subscriber. The location information assists in routing incoming calls to the mobile station 20, and is typically the Signalling System 7 (SS7) address of the visited MSC 42. There is logically one HLR 44 per GSM network 10, although it may be implemented as a distributed database.

The Visitor Location Register (VLR) 46 contains selected administrative information from the HLR, necessary for call control and provision of the subscribed services, for each mobile currently located in the geographical area controlled by the VLR 46. Although the VLR 46 can be implemented as an independent unit, most manufacturers of switching equipment implement the VLR 46 together with the MSC 42 so that the geographical area controlled by the MSC 42 corresponds to that controlled by the VLR 46. The proximity of the VLR 46 to the MSC 42 speeds up access to information that the MSC 42 requires during a call.

Two other registers are used for authentication and security purposes. The Equipment Identity Register (EIR) 47 is a database that contains a list of all valid mobile equipment on the network, where each mobile equipment is identified by its International Mobile Equipment Identity (IMEI). An IMEI is marked as invalid if it has been reported stolen or is not type approved. The Authentication Center (AuC) 48 is a protected database that stores a copy of a secret key stored in each subscriber's SIM card 22, used for authentication and ciphering of the radio channels (Um).

The transfer of signalling information in a standard GSM system follows the layered Open System Interconnect (OSI) model. Radio transmission forms the lowest functional Layer 1 in a GSM system 10. In any telecommunication system, signalling is required to coordinate the necessarily distributed functional entities of the network. On top of the physical Layer 1 (L1) is a data link Layer 2 (L2) providing error-free transmission between adjacent entities, in GSM, the Layer 2 protocol is based on the ISDN LAPD protocol for the Um and Abis interfaces, and on SS7 Message Transfer Protocol (MTP) 70 for the other interfaces.

Functional layers within Layer 3 (L3) are responsible for Radio Resource management (RR), Mobility Management (MM), and Connection Management (CM).

The RR functional layer 53 is responsible for providing a reliable radio link between the mobile station and the network infrastructure. This includes the establishment and allocation of radio channels on the Um interface, as well as the establishment of A interface links to the MSC 42. Handover procedures, an essential element of cellular systems, is managed at this layer, which involves messaging between the mobile station, the BSS 30, and, to a lesser degree, over the MSC 42. Several protocols are therefore used between the different network elements to provide RR functionality.

The MM functional layer 54 assumes a reliable RR layer 53 connection, and is responsible for location management and security. Location management involves procedures and signalling for location updating, so that a current location of each mobile station 20 is stored at the HLR 44. This information is necessary to properly route incoming calls. Security involves the authentication of the mobile station, to prevent unauthorized access to the network, as well as the encryption of all radio link traffic. The protocols in the MM layer 54 communicate with the SIM 22, MSC 42, VLR 46, and the HLR 44, as well as the AuC 48 (which is closely tied with the HLR). These machines in the Network Sub-System (NSS) exchange signalling information through the Mobile Application Part (MAP) 70, which is built on top of Signalling System 7 (SS7).

The CM functional layer 55 is divided into three sub-layers. A Call Control (CC) sub-layer manages call routing, establishment, maintenance, and release, and is closely related to ISDN call control. The idea is for the CC sub-layer to be as independent as possible from the underlying specifics of the mobile network. Another sub-layer is the Supplementary Services (SS) function, which manages the implementation of various supplementary services, and also allows users to access and modify their service subscription. A final sub-layer is the Short Message Service layer (SMS), which handles the routing and delivery of short messages, both from and to the mobile subscriber.

Still other layers are associated with other functionality of the NSS 40. For example, a Signalling Connection Control Part (SCCP) 71, also built upon an SS7 protocol stack, is responsible for routing messages between signalling points. The message transfer part (MTP) 70 provides the functionality of OSI Layers 1, 2, and 3 to provide reliable transport of signalling data to SS7 user parts. TCAP 72 and MAP 73 provide, respectively, Layers 4 through 6 and Layer 7 functionality within the NSS 40.

A Base Station Subsystem Application Part (BSSAP) 75 supports paging and other RR messages exchanged between the MSC 42, and BSC 34 control task messages.

Figure 2:
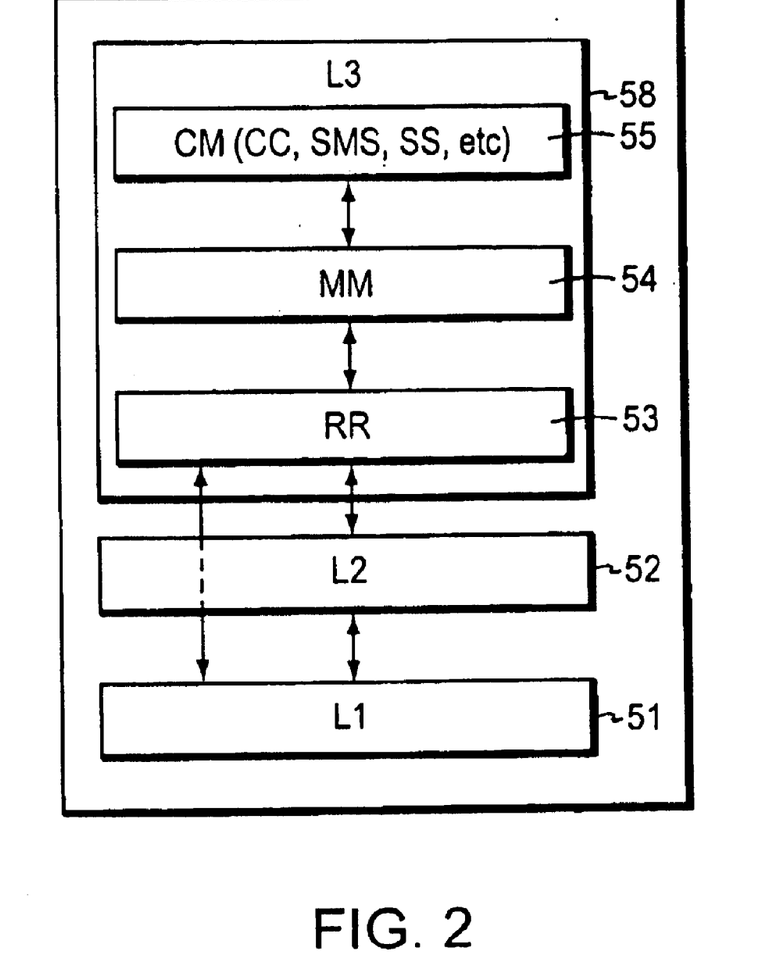
FIG. 2 is a more detailed diagram illustrating how the GSM protocol stack components may be resident in a common layered configuration.

Turning attention now to FIG. 2, the present invention will be described more particularly. The standard GSM reference model implementation considers various components of the RR 53, MM 54, and CM 55 to be distributed among the mobile station 20 as well as the BTS 32 and BSC 34. However, within the mobile station 20 and within certain so-called super base stations which implement MSC 42, BSC 34, and BTS 32 functionality within the same physical hardware, these functions are typically considered to be built upon a layered model as shown in FIG. 2. Specifically, messages travel from Layer 1 (L1) to Layer 2 (L2) as per the standard OSI layered protocol model. Except for Radio Resource management (RR) 53 messages intended for Layer 1, normal over-the-air messages, that is, messages traveling over the Um interface, are typically passed up and down between the sub-layers. For example, transmission of a CM 55 message will cause the message to step down layers one by one to the MM 54, the RR 53, into Layer 2 and finally to Layer 1 which then sends the message over the air. In this layered model, both the RR 53 and MM 54 in effect bear a multiplex function on behalf of the layers above them. They process messages intended for themselves but pass along messages intended for higher level layers.

Figure 3:
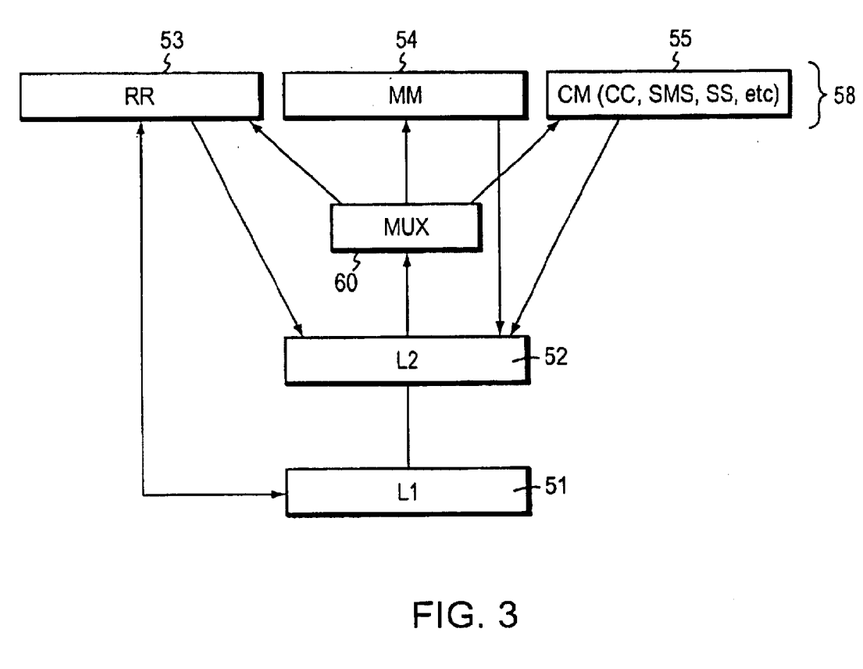
FIG. 3 is a diagram illustrating a flattened GSM protocol model according to the invention.

A shorter affective transmission path of MM and CM Layer 3 messages can be achieved by flattening the protocol model to the stack model shown in FIG. 3. In this flattened model, a new multiplex function (MUX) 60 takes the place of previously scattered multiplexing functions associated with RR 53 and MM 54 in prior implementations, centralizing them in the single function. The multiplex function 60 assumes responsibility for processing all messages intended for Layer 3 passed from Layer 2, and then dispatches them to the RR 53, MM 54, or CM 55 function as appropriate.

In a preferred embodiment, the multiplex function 60 performs this centralized functionality only for uplink messages, that is, for messages traveling from the mobile station 20 towards the BSC 34 and MSC 42. Downlink messages intended for functional layers RR 53, MM 54, and CM 55 are directly passed to Layer 2 without employing any in between bridging functionality.

In addition, any messages which do not require acknowledgment such as paging request or immediate assignment-type messages can also bypass the multiplex function.

As shown in FIG. 3, the multiplex function 60 can be implemented as an independent Layer 3 entity, such that the multiplex function 60 is treated on an equal basis with the other Layer 3 functionalities RR 53, MM 54, and CM 55, as seen from Layer 2 52.

Figure 4:
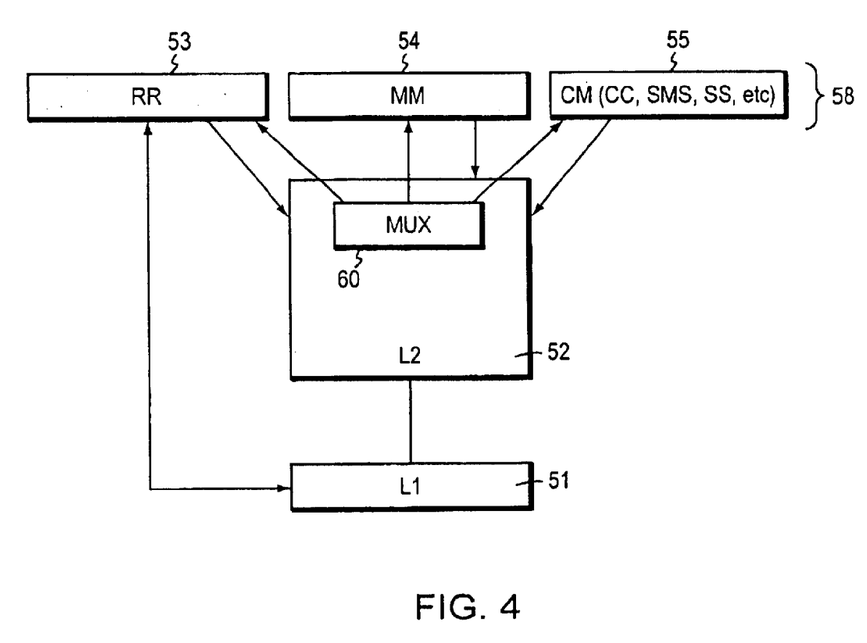
FIG. 4 shows how a multiplex function associated with the flattened GSM protocol model may be implemented within part of a Layer 2 (L2) function.

However, in an alternative embodiment as shown in FIG. 4, the multiplex function 60 may be implemented as part of Layer 2, and process Layer 3 messages as they are passed by Layer 2 up to Layer 3.

Figure 5:
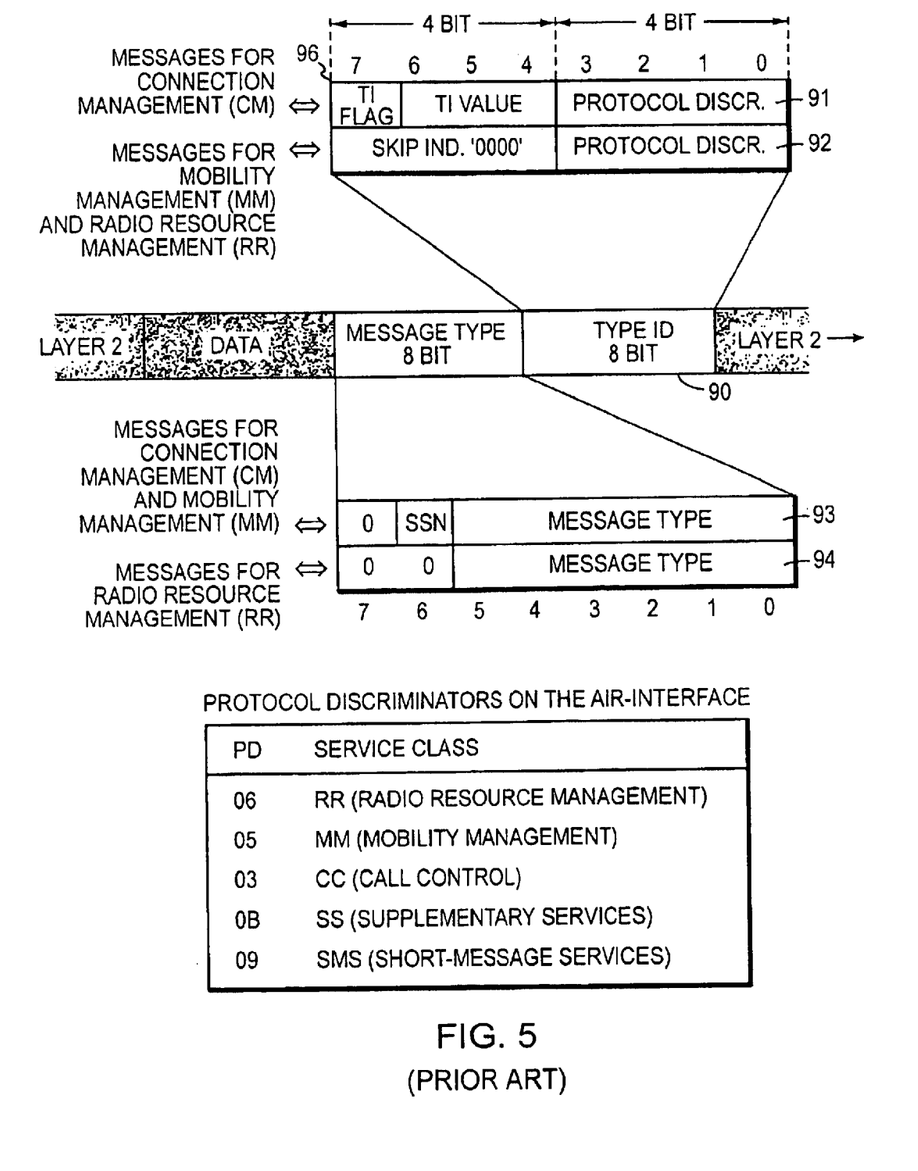
FIG. 5 is a detailed diagram of the format of Layer 3 messages on the Um air interface and associated protocol discriminators.

Regardless of where the multiplex function 60 is implemented, it may take advantage of certain message fields embedded within a GSM Layer 3 message in order to expedite routing to the respective functional layer RR 53, MM 54, or CM 55. Specifically, as shown in FIG. 5, the standard format for a Layer 3 message within the GSM protocol contains a field known as a type identifier 90. The type identifier field 90 may take two forms depending upon the value of a TI field 96. In a first instance, a TI field indicates that the message is intended for call control, i.e., the connection management (CM) layer 55. In other instances, the messages are indicated by a skip indicator of 000 as a message intended for mobility management 54 or radio resource management 53. In either case, a protocol discriminator field 90 or 91 within the type identifier 90 indicates a service class for the message.

As shown in the table in FIG. 5, the protocol discriminator of "06" indicates an RR 53 service class message, "05" indicates an MM 54 service class message, and "03", "0B", or "09" indicate a CM 55 class message containing call control, supplementary services, or short message services signalling. Thus, the multiplex function 60 may make use of the service class designations within the protocol discriminator field of Layer 3 messages in order to determine how to route the message to the proper functional layer.

As can now be appreciated, the flattened models as shown in FIGS. 3 and 4 can effectively reduce the time consumed when messages flow from Layer 2 towards the MM 54 or CM 55 functional layers and vice versa. Typically, when messages flow through a longer path, they experience more buffering or queuing time. This collectively increases the time needed for signalling procedures.

For time sensitive procedures such as location update, handover processing, and cell reselection, the flattened Layer 3 protocol model having a centralized multiplex function 60 can shorten processing for all Layer 3 messages. Consider that the radio resources management (RR) layer 53 oversees the establishment of a link, both radio and fixed, between the mobile station 20 and the MSC 42. The main functional components involved are the mobile station 20, the BSS 30, as well as the MSC 42. The RR layer 53 is concerned with the management of an RR-session, which is the time that a mobile is in dedicated mode, as well as the configuration of radio channels including the allocation of dedicated channels.

An RR session is always initiated by a mobile station 20 through an access procedure, either for an outgoing call, or in response to a paging message. The details of the access and paging procedures, such as when a dedicated channel is actually assigned to the mobile 20, and the paging sub-channel structure, are handled in the RR layer 53. In addition, it handles the management of radio features such as power control, discontinuous transmission and reception, and timing advance.

In a cellular network, the radio and fixed links required are not permanently allocated for the duration of a call. Handover, or handoff as it is called in North America, is the switching of an on-going call to a different channel or cell. The execution and measurements required for handover form one of basic functions of the RR layer 53.

There are four different types of handover in a GSM system, which involve transferring a call between (a) channels (time slots) in the same cell; (b) cells (Base Transceiver Stations) under the control of the same Base Station Controller (BSC); (c) cells under the control of different BSCs, but belonging to the same Mobile Services Switching Center (MSC), or (d) cells under the control of different MSCs.

The first two types of handover, called internal handovers, involve only one Base Station Controller (BSC) 34. To save signalling bandwidth, they are managed by the BSC 34 without involving the Mobile Switching Center (MSC) 42, except to notify it at the completion of the handover. The last two types of handover, called external handovers, are handled by the MSCs 42 involved. An important aspect of GSM is that the original MSC 42, the anchor MSC 42, remains responsible for most call-related functions, with the exception of subsequent inter-BSC 34 handovers under the control of the new MSC 42, called the relay MSC 42.

Handovers can be initiated by either the mobile or the MSC 42 (as a means of traffic load balancing). During its idle time slots, the mobile scans the Broadcast Control Channel of up to 16 neighboring cells, and forms a list of the six best candidates for possible handover, based on the received signal strength. This information is passed to the BSC 34 and MSC 42, at least once per second, and is used by the handover algorithm. With each of these handover methods, the timing of control messages with the RR 53 sub-layer is critical to successfully completing a handover in a predictable manner. By implementing a multiplex function 60 according to the invention, the require messaging is routed more rapidly.

The Mobility Management layer (MM) 54 handles other functions that arise from the mobility of the subscriber 20, as well as the authentication and security aspects. Location management is concerned with the procedures that enable the system 10 to know the current location of a powered-on mobile station 20 so that incoming call routing can be completed.

To implement and maintain location updating, a powered-on mobile station 20 is informed of an incoming call by a paging message sent over the paging channel of that cell. A compromise solution used in GSM is to group cells into location areas. Updating messages are required when moving between location areas, and mobile stations 20 are paged in the cells of their current location area.

The location updating procedures, and subsequent call routing, use the MSC 42 and the Home Location Register (HLR) 44 and the Visitor Location Register (VLR) 46. When a mobile station is switched on in a new location area, or it moves to a new location area or different operator's area, it must register with the network to indicate its current location. In the normal case, a location update message is sent to the new MSC/VLR, which records the location area information, and then sends the location information to the subscriber's HLR 44. The information sent to the HLR 44 is normally the SS7 address of the new VLR 46, although it may be a routing number. The reason a routing number is not normally assigned, even though it would reduce signalling, is that there is only a limited number of routing numbers available in the new MSC/VLR and they are allocated on demand for incoming calls. If the subscriber is entitled to service, the HLR 44 sends a subset of the subscriber information, needed for call control, to the new MSC/VLR, and sends a message to the old MSC/VLR to cancel the old registration.

For reliability reasons, GSM also has a periodic location updating procedure. If an HLR 44 or MSC/VLR fails, to have each mobile register simultaneously to bring the database up to date would cause overloading. Therefore, the database is updated as location updating events occur. The enabling of periodic updating, and the time period between periodic updates, is controlled by the operator, and is a trade-off between signalling traffic and speed of recovery. If a mobile does not register after the updating time period, it is de-registered.

Again, the timing of messages within the MM functional layer 54 is critical to predictable system operations.

The Connection Management (CM) 55 functional layer is responsible for Call Control (CC), Supplementary Service (SS) management, and Short Message Service (SMS) management as previously mentioned. Each of these may be considered as a separate sublayer within the CM functional layer. Call control attempts to follow ISDN procedures, although routing to a roaming mobile subscriber is unique to GSM. Other functions of the CC sublayer include call establishment, selection of the type of service (including alternating between services during a call), and call release.

Unlike call routing in the fixed network, where a terminal is semi-permanently wired to a central office, a GSM user can roam nationally and even internationally. The directory number dialed to reach a mobile subscriber is called the Mobile Subscriber ISDN (MSISDN). This number includes a country code and a National Destination Code which identifies the subscriber's operator. The first few digits of the remaining subscriber number may identify the subscriber's HLR 44 within its home area. An incoming mobile terminating call is directed to a Gateway MSC (GMSC) function. The GMSC is basically a switch which is able to interrogate the subscriber's HLR 44 to obtain routing information, and thus contains a table linking MSISDNs to their corresponding HLR. A simplification is to have a GSMC handle one specific area. It should be noted that the GMSC function is distinct from the MSC 42 function, but is usually implemented in an MSC 42.

The routing information that is returned to the GMSC is a Mobile Station Roaming Number (MSRN). MSRNs are related to the geographical numbering plan, and not assigned to subscribers, nor are they visible to subscribers.

The most general routing procedure begins with the GMSC querying the called subscriber's HLR 44 for an MSRN. The HLR 44 typically stores only the SS7 address of the subscriber's current VLR 46, and does not have the MSRN (see the location updating section). The HLR 44 must therefore query the subscriber's current VLR 46, which will temporarily allocate an MSRN from its pool for the call. This MSRN is returned to the HLR 44 and back to the GMSC, which can then route the call to the new MSC 42. At the new MSC 42, the IMSI corresponding to the MSRN is looked up, and the mobile is paged in its current location area.

As with other Layer 3 functions, messages handled by the Connection Management (CM) layer should be efficiently routed to avoid problems with incomplete or dropped calls.

The invention can be implemented with other wireless protocols which use a data link layer (Layer 2) and network layer (Layer 3) having layered functional attributes similar to GSM. For example, wireless protocols such as the Telecommunications Industry Association (TIA) Code Division Multiple Access (CDMA) IS-95 Standard also consider Connection Management (CM), Mobility Management (MM), and Radio Resource (RR) management to be functional layers of the network layer.

While this invention has been particularly shown and described with references to preferred embodiments thereof, it will be understood by those skilled in the art that various changes in form and details may be made therein without departing from the scope of the invention encompassed by the appended claims.

What is claimed is:

1. A method for processing network layer messages within a wireless communication system, the network layer including within it certain functional layers, including a radio resource function, a mobility management function, and a connection management function with at least the radio resource function being normally a transport mechanism for the mobility management and connection management functions, the method comprising the steps of:

examining a network layer message traveling in an uplink direction from a mobile station towards network subsystem components to determine, prior to routing it to any functional layer, whether it is associated with connection management, mobility management, or radio resource management;

routing the message directly to the respective connection management, mobility management, or radio resource management functional layer, without passing the message through each of the functional layers; and processing downlink network layer messages traveling in a downlink direction from network subsystem components towards the mobile station in a direct manner such that the network layer messages do not pass through other layer protocol stacks, the downlink network layer messages that comprise connection management messages being first routed to the mobility management function.

2. A method as in claim 1 wherein the steps of examining and routing the message are performed within a network layer thread as the message is first received by the network layer.

3. A method as in claim 1 wherein the steps of examining and routing the message are performed within a lower layer thread as the message is passed up to the network layer by the lower layer.

4. A method as in claim 1 additionally comprising the step of directly routing network layer messages that do not require acknowledgment.

5. A method as in claim 1 wherein network layer messages that comprise mobility management messages are first routed to the radio resource function.

6. A method as in claim 1 wherein the steps of examining a network layer message and routing the message directly to the respective functional layer are performed in a subsystem incorporating Base Transceiver System (BTS), Base Station Controller (BSC), and Mobile Switching Center Subsystems (MSC).

7. A method as in claim 1 wherein the steps of examining the network layer message and routing the message directly to the respective functional layer are performed in a mobile station (MS).

8. A computer readable medium having computer readable program codes embodied therein for causing a computer to function as a network layer message multiplexer, the network layer including within it certain functional layers, including a radio resource function, a mobility management function, and a connection management function with at least the radio resource function being normally a transport mechanism for the mobility management and connection management functions, the computer readable medium program codes performing functions comprising:

examining a network layer message traveling in an uplink direction from a mobile station towards network subsystem components to determine, prior to routing it to any functional layer, whether it is associated with connection management, mobility management, or radio resource management;

routing the message directly to the respective connection management, mobility management, or radio resource management functional layer, without passing the message through each of the functional layers; and processing downlink network layer messages traveling in a downlink direction from network subsystem components towards the mobile station in a direct manner such that the network layer messages do not pass through other layer protocol stacks, the downlink network layer messages that comprise connection management messages being first routed to the mobility management function.

9. A computer readable medium as in claim 8 wherein the functions of examining and routing the message are performed within a network layer thread as the message is first received by the network layer.

10. A computer readable medium as in claim 8 wherein the functions of examining and routing the message are performed within a lower layer thread as the message is passed up to the network layer by the lower layer.

11. A computer readable medium as in claim 8 additionally comprising the function of directly routing network layer messages that do not require acknowledgment.

12. A computer readable medium as in claim 8 wherein network layer messages that comprise mobility management messages are first routed to the radio resource function.

13. A computer readable medium as in claim 8 wherein the functions of examining a network layer message and routing the message directly to the respective functional layer are performed in a subsystem incorporating Base Transceiver System (BTS), Base Station Controller (BSC), and Mobile Switching Center Subsystems (MSC).

14. A computer readable medium as in claim 8 wherein the functions of examining the network layer message and routing the message directly to the respective functional layer are performed in a mobile station (MS).

15. A network layer messaging multiplexer apparatus that processes network layer messages within a wireless communication system, the network layer including within it certain functional layers, including a radio resource function, a mobility management function, and a connection management function with at least the radio resource function being normally a transport mechanism for the mobility management and connection management functions with a data link layer, the apparatus comprising:
  a first interface that enables the routing of network layer messages to said radio resource functional layer;
  a second interface that enables the routing of network layer messages to said mobility management functional layer;
  a third interface that enables the routing of network layer messages to said connection management functional layer;
  a fourth interface that enables the routing of network layer messages from said data link layer; and
  a multiplexer function that examines a network message to determine, prior to routing it to any functional layer, whether it is associated with connection management, mobility management, or radio resource management and routs the message directly to the respective connection management, mobility management, or radio resource management functional layer, without passing the message through each of the functional layers.

16. An apparatus as in claim 15 wherein the functions of examining and routing the message are performed within a network layer thread as the message is first received by the network layer.

17. An apparatus as in claim 15 wherein the functions of examining and routing the message are performed within a lower layer thread as the message is passed up to the network layer by the lower layer.

18. An apparatus as in claim 15 additionally comprising the function of directly routing network layer messages that do not require acknowledgment.

19. An apparatus as in claim 15 wherein network layer messages that comprise mobility management messages are first routed to the radio resource function.

20. An apparatus as in claim 15 wherein the functions of examining a network layer message and routing the message directly to the respective functional layer are performed in a subsystem incorporating Base Transceiver System (BTS), Base Station Controller (BSC), and Mobile Switching Center Subsystems (MSC).

21. An apparatus as in claim 15 wherein the functions of examining the network layer message and routing the message directly to the respective functional layer are performed in a mobile station (MS).

22. A wireless communications system with messaging and other functionalities defined by a layered protocol, the system comprising:
  a physical layer;
  a data link layer that packages data from the physical layer for routing;
  a network layer that routes a message containing the packaged data from the data link layer to a recipient, the network layer including within it certain functional layers, including a radio resource function, a mobility management function, and a connection management function with at least the radio resource function being normally a transport mechanism for the mobility management and connection management functions;
  a means for examining a network layer message traveling in an uplink direction from a mobile station towards network subsystem components to determine, prior to routing it to any functional layer, whether it is associated with connection management, mobility management, or radio resource management;
  a means for routing the message directly to the respective connection management, mobility management, or radio resource management functional layer, without passing the message through each of the functional layers; and
  a means for processing downlink network layer messages traveling in a downlink direction from network subsystem components towards the mobile station in a direct manner such that the network layer messages do not pass through other layer protocol stacks, the downlink network layer messages that comprise connection management messages being first routed to the mobility management function.

23. A system as in claim 22 wherein the means for examining and routing the message are performed within a network layer thread as the message is first received by the network layer.

24. A system as in claim 22 wherein the means for examining and routing the message are performed within a lower layer thread as the message is passed up to the network layer by the lower layer.

25. A system as in claim 22 additionally comprising the means for directly routing network layer messages that do not require acknowledgment.

26. A system as in claim 22 wherein network layer messages that comprise mobility management messages are first routed to the radio resource function.

27. A system as in claim 22 wherein the means for examining a network layer message and routing the message directly to the respective functional layer are performed in a subsystem incorporating Base Transceiver System (BTS), Base Station Controller (BSC), and Mobile Switching Center Subsystems (MSC).

28. A system as in claim 22 wherein the means for examining the network layer message and routing the message directly to the respective functional layer are performed in a mobile station (MS).

29. A method for processing network layer messages within a wireless communication system using a multiplexer function, the network layer including within it certain functional layers, including a radio resource function, a mobility management function, and a connection management function with at least the radio resource function being normally a transport mechanism for the mobility management and connection management functions with a data link layer, the method comprising the steps of:

routing network layer messages to said radio resource functional layer using a first interface;

routing network layer messages to said mobility management functional layer using a second interface;

routing network layer messages to said connection management functional layer using a third interface;

routing network layer messages from said data link layer using a fourth interface; and examining a network message to determine, prior to routing it to any functional layer, whether it is associated with connection management, mobility management, or radio resource management and routing the message directly to the respective connection management, mobility management, or radio resource management functional layer, without passing the message through each of the functional layers.

30. A method as in claim 29 wherein the steps of examining and routing the message are performed within a network layer thread as the message is first received by the network layer.

31. A method as in claim 29 wherein the steps of examining and routing the message are performed within a lower layer thread as the message is passed up to the network layer by the lower layer.

32. A method as in claim 29 additionally comprising the step of directly routing network layer messages that do not require acknowledgment.

33. A method as in claim 29 wherein network layer messages that comprise mobility management messages are first routed to the radio resource function.

34. A method as in claim 29 wherein the steps of examining a network layer message and routing the message directly to the respective functional layer are performed in a subsystem incorporating Base Transceiver System (BTS), Base Station Controller (BSC), and Mobile Switching Center Subsystems (MSC).

35. A method as in claim 29 wherein the steps of examining the network layer message and routing the message directly to the respective functional layer are performed in a mobile station (MS).

36. A computer readable medium having computer readable program codes embodied therein for causing a computer to function as a network layer message multiplexer, the network layer including within it certain functional layers, including a radio resource function, a mobility management function, and a connection management function with at least the radio resource function being normally a transport mechanism for the mobility management and connection management functions with a data link layer, the computer readable medium program codes performing functions comprising:

routing network layer messages to said radio resource functional layer using a first interface;

routing network layer messages to said mobility management functional layer using a second interface;

routing network layer messages to said connection management functional layer using a third interface;

routing network layer messages from said data link layer using a fourth interface; and examining a network message to determine, prior to routing it to any functional layer, whether it is associated with connection management, mobility management, or radio resource management and routing the message directly to the respective connection management, mobility management, or radio resource management functional layer, without passing the message through each of the functional layers.

37. A computer readable medium as in claim 36 wherein the functions of examining and routing the message are performed within a network layer thread as the message is first received by the network layer.

38. A computer readable medium as in claim 36 wherein the functions of examining and routing the message are performed within a lower layer thread as the message is passed up to the network layer by the lower layer.

39. A computer readable medium as in claim 36 additionally comprising the function of directly routing network layer messages that do not require acknowledgment.

40. A computer readable medium as in claim 36 wherein network layer messages that comprise mobility management messages are first routed to the radio resource function.

41. A computer readable medium as in claim 36 wherein the functions of examining a network layer message and routing the message directly to the respective functional layer are performed in a subsystem incorporating Base Transceiver System (BTS), Base Station Controller (BSC), and Mobile Switching Center Subsystems (MSC).

42. A computer readable medium as in claim 36 wherein the functions of examining the network layer message and routing the message directly to the respective functional layer are performed in a mobile station (MS).

* * * * *

UNITED STATES PATENT AND TRADEMARK OFFICE
CERTIFICATE OF CORRECTION

PATENT NO. : 6,879,568 B1
DATED : April 12, 2005
INVENTOR(S) : Xiadode Xu et al.

It is certified that error appears in the above-identified patent and that said Letters Patent is hereby corrected as shown below:

Column 9,
Line 67, insert -- assumed to be -- after "normally";

Column 10,
Line 52, insert -- assumed to be -- after "normally";

Column 11,
Line 36, insert -- assumed to be -- after "normally";

Column 12,
Line 27, insert "assumed to be" after "normally";

Column 13,
Line 11, insert "assumed to be" after "normally"; and

Column 14,
Line 7, insert -- assumed to be -- after "normally"

Signed and Sealed this

Twenty-eighth Day of June, 2005

JON W. DUDAS
*Director of the United States Patent and Trademark Office*